United States Patent
Scherg

(10) Patent No.: US 6,564,496 B2
(45) Date of Patent: May 20, 2003

(54) ICE FISHING TIP UP

(75) Inventor: Benjamin Scott Scherg, Appleton, WI (US)

(73) Assignee: BBJ Outdoor Innovations, LLC., Green Bay, WI (US)

( * ) Notice: Subject to any disclaimer, the term of this patent is extended or adjusted under 35 U.S.C. 154(b) by 0 days.

(21) Appl. No.: 09/820,541

(22) Filed: Mar. 29, 2001

(65) Prior Publication Data

US 2002/0139033 A1 Oct. 3, 2002

(51) Int. Cl.[7] ............................................... A01K 91/06
(52) U.S. Cl. ................................................. 43/17; 43/15
(58) Field of Search ................................. 43/15, 16, 17

(56) References Cited

U.S. PATENT DOCUMENTS

| | | | | |
|---|---|---|---|---|
| 2,419,378 A | * | 4/1947 | Thomas et al. ................. | 43/15 |
| 2,567,340 A | | 9/1951 | Lytle ............................... | 43/15 |
| 2,726,470 A | | 12/1955 | Bass et al. ...................... | 43/15 |
| 2,818,671 A | | 1/1958 | Crouch ........................... | 43/15 |
| 3,550,302 A | | 12/1970 | Creviston et al. .............. | 43/16 |
| 3,600,837 A | | 8/1971 | Bristol ........................ | 43/19.2 |
| 3,766,680 A | * | 10/1973 | Torme et al. ................... | 43/16 |
| 4,021,957 A | | 5/1977 | Gleason .......................... | 43/16 |
| 4,120,112 A | | 10/1978 | McBain ...................... | 43/19.2 |
| 4,121,367 A | * | 10/1978 | Gonnello ........................ | 43/16 |
| 4,228,609 A | * | 10/1980 | Gonnello ........................ | 43/16 |
| 4,253,262 A | | 3/1981 | Johnson .......................... | 43/17 |
| 4,270,297 A | | 6/1981 | Yates ................................ | 43/4 |
| 4,373,287 A | | 2/1983 | Grahl ............................. | 43/17 |
| 4,420,900 A | | 12/1983 | Nestor ............................ | 43/17 |
| 4,566,216 A | | 1/1986 | Randall .......................... | 43/17 |
| 4,642,930 A | | 2/1987 | Graf ............................ | 43/19.2 |
| 4,662,099 A | | 5/1987 | Stewart .......................... | 43/17 |
| 4,680,885 A | | 7/1987 | Lindell et al. ................ | 43/19.2 |
| 4,787,166 A | | 11/1988 | Vogt et al. ...................... | 43/17 |
| 4,811,514 A | | 3/1989 | Jordan ........................ | 43/19.2 |
| 4,821,448 A | | 4/1989 | Lindaberry .................. | 43/19.2 |
| 4,944,106 A | | 7/1990 | Wu et al. ........................ | 43/15 |
| 4,945,668 A | | 8/1990 | Keller ............................. | 43/17 |
| 5,020,263 A | | 6/1991 | Werner ........................... | 43/17 |
| 5,036,616 A | | 8/1991 | Wilsey ........................ | 43/26.1 |
| 5,056,255 A | | 10/1991 | Campbell .................... | 43/19.2 |
| 5,235,773 A | * | 8/1993 | Rinehart ......................... | 43/17 |
| 5,461,817 A | | 10/1995 | Flood .......................... | 43/19.2 |
| 5,535,538 A | | 7/1996 | Heuke .......................... | 43/19.2 |
| 5,540,009 A | | 7/1996 | Sykes ............................... | 43/4 |
| 5,540,010 A | | 7/1996 | Aragona ..................... | 43/19.2 |
| 5,564,213 A | | 10/1996 | Rinehart ......................... | 43/17 |
| 5,598,656 A | | 2/1997 | Strasser ......................... | 43/17 |
| 6,088,945 A | | 7/2000 | Sanderfoot ...................... | 43/4 |

* cited by examiner

Primary Examiner—Charles T. Jordan
Assistant Examiner—Susan C. Alimenti
(74) Attorney, Agent, or Firm—Wilhelm Law Service; Thomas D. Wilhelm

(57) ABSTRACT

Ice fishing tip ups which comprise a support structure, a collar, a shaft, a spring, a stop, a spool and a signal device. When the tip up is set for catching fish, the spool can rotate about its axis a limited distance before the spring jerks the shaft upwardly to set the hook. The spool is generally restrained from rotation while the spring is jerking the shaft upwardly. The spool can freely rotate and pay out line after the spring jerks the shaft upwardly. The tip up structure comprehends a plurality of set positions, including a plurality of notches defining such set positions, and either rolling engagement or sliding engagement of a stop with respect to the notches. In preferred embodiments, the spring and stop are cooperatively sized, configured and mounted such that spring and stud freely move with ongoing interaction with each other without deleteriously impeding each other's activity.

40 Claims, 5 Drawing Sheets

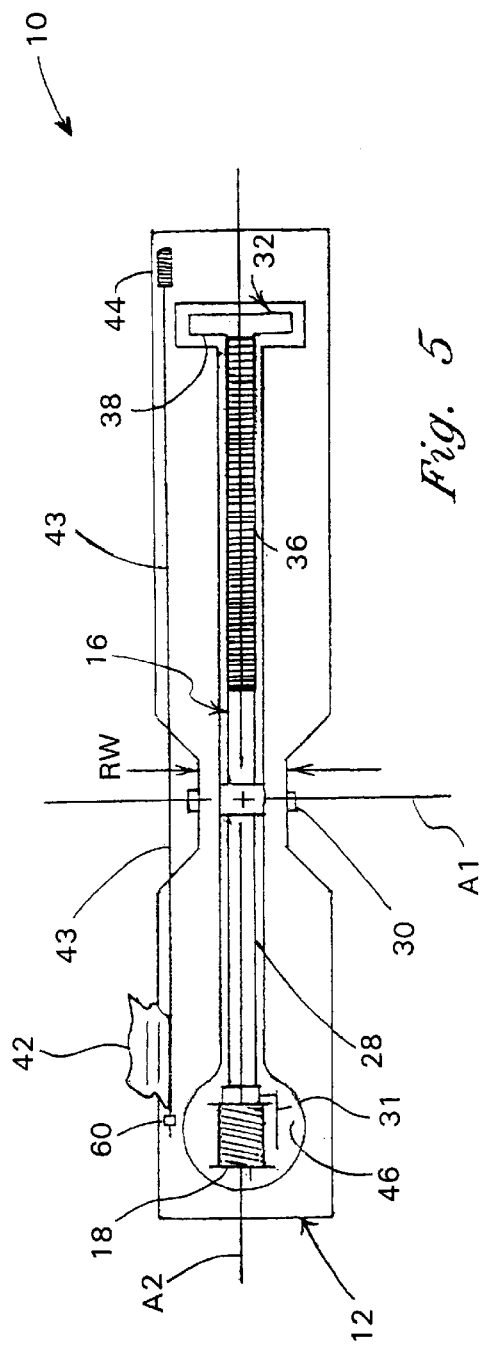
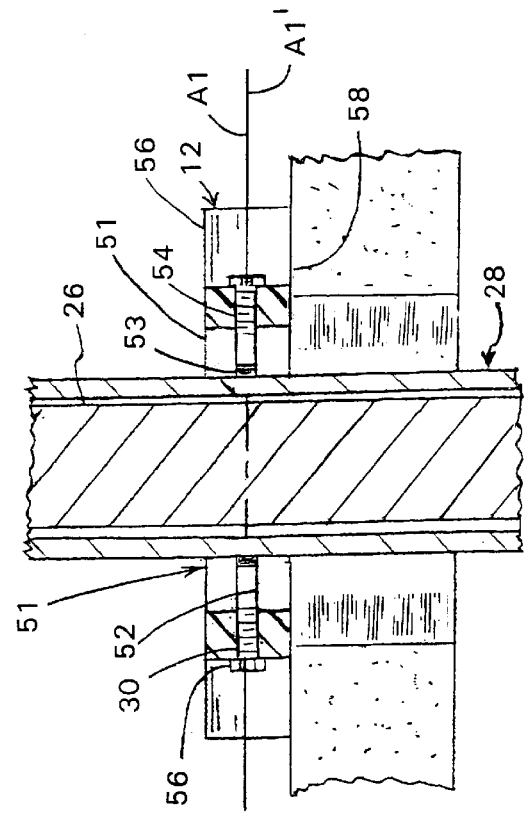
Fig. 5
Fig. 6

ICE FISHING TIP UP

BACKGROUND

This invention relates to ice fishing tip ups. A typical such tip up is placed over a hole cut in the ice of e.g. a lake or river, and holds a spool of line. The spool of line typically terminates at a baited hook, the hook being lowered into the water in preparation for hooking and retrieving a fish which takes the bait.

In a conventional tip up, when a fish takes the bait, and thus pulls on the line, the pull on the line activates free rotation of the spool in response to the pull on the line. Namely, the fish freely swims away with the bait and/or hook, and may or may not become hooked. Such rotation of the spool, typically operates to activate a signal device on the tip up. The activation of the signal device indicates to the fisherman that a fish has moved the bait. The fisherman moves to the tip up, and hopefully pulls in the fish.

However, by the time the fisherman gets to the tip up in response to activation of the signal device, the fish may have spit out the bait, or taken the bait off the hook and spit out the hook. One reason such failure to hook the fish occurs is because no resistance is quickly applied to the fishing line in response to the fish's strike, sufficient to set the hook in the mouth of the fish. Thus, since there is no pull by the fisherman shortly after the fish takes the bait, the fish is not hooked, the strike is wasted, and the fish gets away. Good for the fish. Not good for the one who is trying to catch fish.

By contrast, in conventional sport fishing, where the fisherman holds the rod or line in his hand, the fisherman responds to a strike, or other movement of bait by the fish, by promptly pulling or jerking the line upwardly to set the hook. This action hopefully firmly embeds the point of the hook, and thus the hook, in the mouth of the fish before the fish can spit out the hook.

In conventional ice fishing, tip ups which provide automated resistance or jerk response to a strike are known, and are accompanied by limited success in actually retrieving hooked fish. Some such tip ups severely restrict or stop pay out of line after the fish strikes, whereby the resistance applied may be limited to the resistance to payout of line, and whereby the fish may not be hooked, or a sufficiently large fish can break the line. Other such tip ups can pay out a substantial amount of fish line before applying the resistance or jerk, thus giving the fish time to get the bait off the hook and/or to feel the hook, and to spit out the hook before the resistance or jerk is activated. While such conventional tip up designs are known in the art, such designs are believed to have experienced little, if any success in the commercial marketplace because of their limited effectiveness in hooking fish.

It is an object of this invention to provide an ice fishing tip up which responds promptly to a fish biting the hook, with an aggressive jerk on the hook to set the hook in the fish's mouth, and which thereafter provides generally unrestricted payout of such fishing line as is carried on the spool.

SUMMARY

This invention comprehends ice fishing tip ups which are generally comprised of a support structure, a collar, a shaft, a spring, a stop, a spool and a signal device. The support structure supports the tip up on a surface of ice through which a user wishes to fish. The collar is mounted to the support structure for extension along a first axis transverse to the support structure and toward a hole in the ice. The shaft is mounted in the tip up along a second axis which generally coincides with the first axis. The shaft is mounted for rotation with respect to the collar and is movable generally along the second axis relative to the collar between a released position and one of a plurality of longitudinally distinct set positions. The spring biases the shaft against movement of the shaft with respect to the collar toward a respective one of the set positions, thus to jerk the shaft upwardly relative to the collar. The stop, on one of the collar and the shaft, is mounted for temporarily coupling the shaft and the collar together when the shaft is moved to the set position against biasing force of the spring. The spool is adapted to carry fishing line and corresponding hook on the fishing line, the spool being mounted for rotation about a third axis concurrent with rotation of the shaft about the second axis. The signal device is activated when a fish pulls on the hook.

In some embodiments, the spool is mounted for free-spool rotation about the third axis concurrent with rotation of the shaft about the second axis.

In preferred embodiments, the spool is free to rotate without active restraint, and thus to pay out fishing line, after the spring jerks the shaft upwardly.

In preferred embodiments, the ice fishing tip up comprises a slot extending longitudinally of the collar, and a plurality of notches extending transversely from the direction of extension of the slot. The stop comprises a stud compatible with traverse of the stud along the slot when the shaft is moved to the set position against the biasing force of the spring, and with traverse into a selected one of the notches, whereby the spring biases the stud against the collar at an edge of the respective slot.

In preferred embodiments, the collar has a top edge, the slot extending downwardly from the top edge of the collar, the tip up being effectively set for hooking fish by turning the shaft, as necessary, about the second axis to bring the stud into alignment with the slot, pushing the shaft downwardly with respect to the collar and against biasing resistance force of the spring, whereby the stud progresses downwardly in the slot, turning the shaft with respect to the second axis and thereby engaging the stud in a selected notch, and releasing downward force on the shaft whereby the stud engages the collar at an engagement edge of the collar at the respective notch.

In preferred embodiments, the stop accommodates uncoupling of the shaft and the collar when a fish pulls on the hook, resulting in the shaft, and thus the hook, being jerked upwardly by the biasing force of the spring, the spool being free to rotate without active restraint, and thus to pay out line, after the spring jerks the shaft upwardly.

In some embodiments, release of the stud from engagement with the collar comprises frictional sliding of the stud against the collar at the respective engagement edge of the collar at the respective notch, whereby magnitude of the upward jerk and the magnitude of the sliding force both strongly correlate with the relative position of the respective notch along the length of the slot.

In other embodiments, release of the stud from engagement with the collar comprises rolling engagement of the stud against the collar at the respective engagement edge of the respective collar at the respective notch, whereby magnitude of force required to effect release of the stud from the respective notch is generally independent of the relative position of the notch along the length of the slot, while magnitude of the upward jerk strongly correlates to the relative position of the notch along the length of the slot.

In typical embodiments, the spool is restrained against rotating and thus paying out line concurrent with the spring jerking the shaft upwardly. Also in typical embodiments, the spool can rotate about the third axis a limited distance before the spring jerks the shaft upwardly, the spool is generally restrained from rotation while the spring is jerking the shaft upwardly, and the spool can freely rotate and pay out line after the spring jerks the shaft upwardly.

The stop can be mounted on one of the collar and the shaft and can extend toward the other of the collar and the shaft, the other of the collar and the shaft comprising a slot extending longitudinally of the respective collar or shaft, and a plurality of notches extending transversely from the direction of extension of the slot. Such stop is compatible with traverse of the stop along the slot when the shaft is moved from the released position to a respective one of the set positions against the biasing force of the spring, and with traverse of the stop into a selected one of the notches, whereby the spring biases the stop against the collar at an engagement edge of the collar at the respective notch. In such embodiments, release of the stop from engagement with the collar, and corresponding uncoupling of the shaft and the collar from each other when a fish pulls on the hook, results in the spring exerting an upward jerk on the shaft, and a corresponding upward jerk on the hook. Such release of the stop from engagement with the collar can comprise the recited rolling engagement of the stop against the respective edge of the collar at the respective notch, whereby magnitude of force required to effect release of the stop from the respective notch is generally independent of which of the notches along the length of the slot is selected for the set position of the stop.

In the alternative, such release of the stop from engagement with the collar can comprise the recited frictional sliding engagement of the stop against the respective edge of the collar at the respective notch, whereby magnitude of force required to effect release of the stud from the respective notch, and magnitude of the upward jerk, are both related to the relative position of the respective notch along the length of the slot.

In some embodiments, the spool is mounted to the shaft and rotates about a third axis of rotation independent of rotation of the shaft.

In some embodiments, the spool can rotate about the third axis a limited distance before the spring jerks the shaft upwardly; the spool is generally restrained from rotation while the spring is jerking the shaft upwardly; and the spool can freely rotate after the spring jerks the shaft upwardly.

In some embodiments, the engagement edge of the collar at a respective notch defines an angle α of about 2 degrees to about 25 degrees, preferably about 2 degrees to about 10 degrees, with respect to a perpendicular measured from a line parallel to the first axis, whereby the biasing force of the spring urges the stud away from the slot and into enhanced engagement with the collar at a distal end of the notch.

BRIEF DESCRIPTION OF THE DRAWINGS

FIG. 5 shows a top view of a tip up of the invention when the tip up is folded into a compacted storage configuration.

FIG. 6 is an enlarged representative fragmentary cross-section taken at 6—6 of FIG. 2, showing the mounting pins mounting the collar to the platform.

Figure 1:
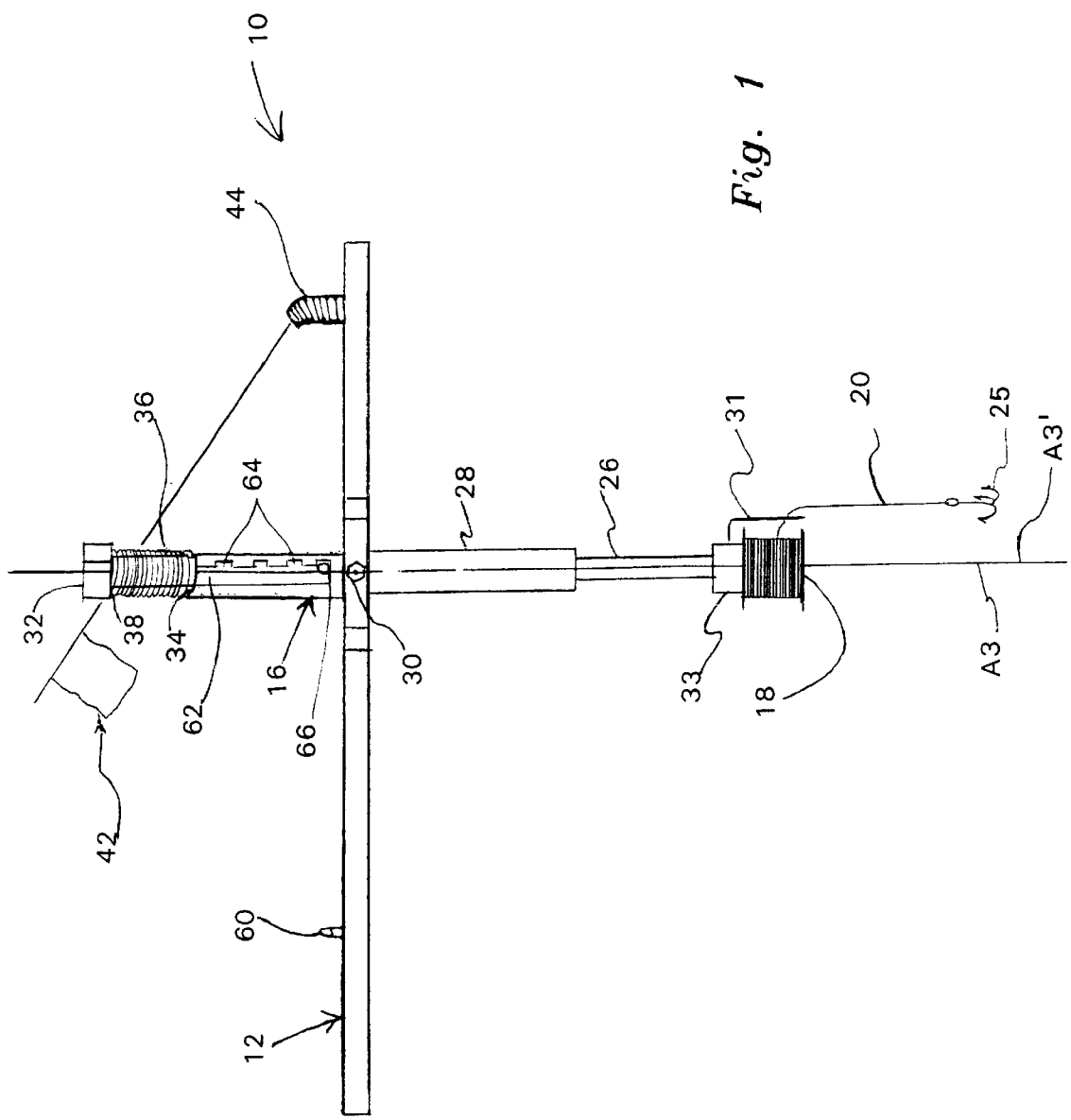
FIG. 1 shows a side elevation of a tip up of the invention in the set position.

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

Figure 2:
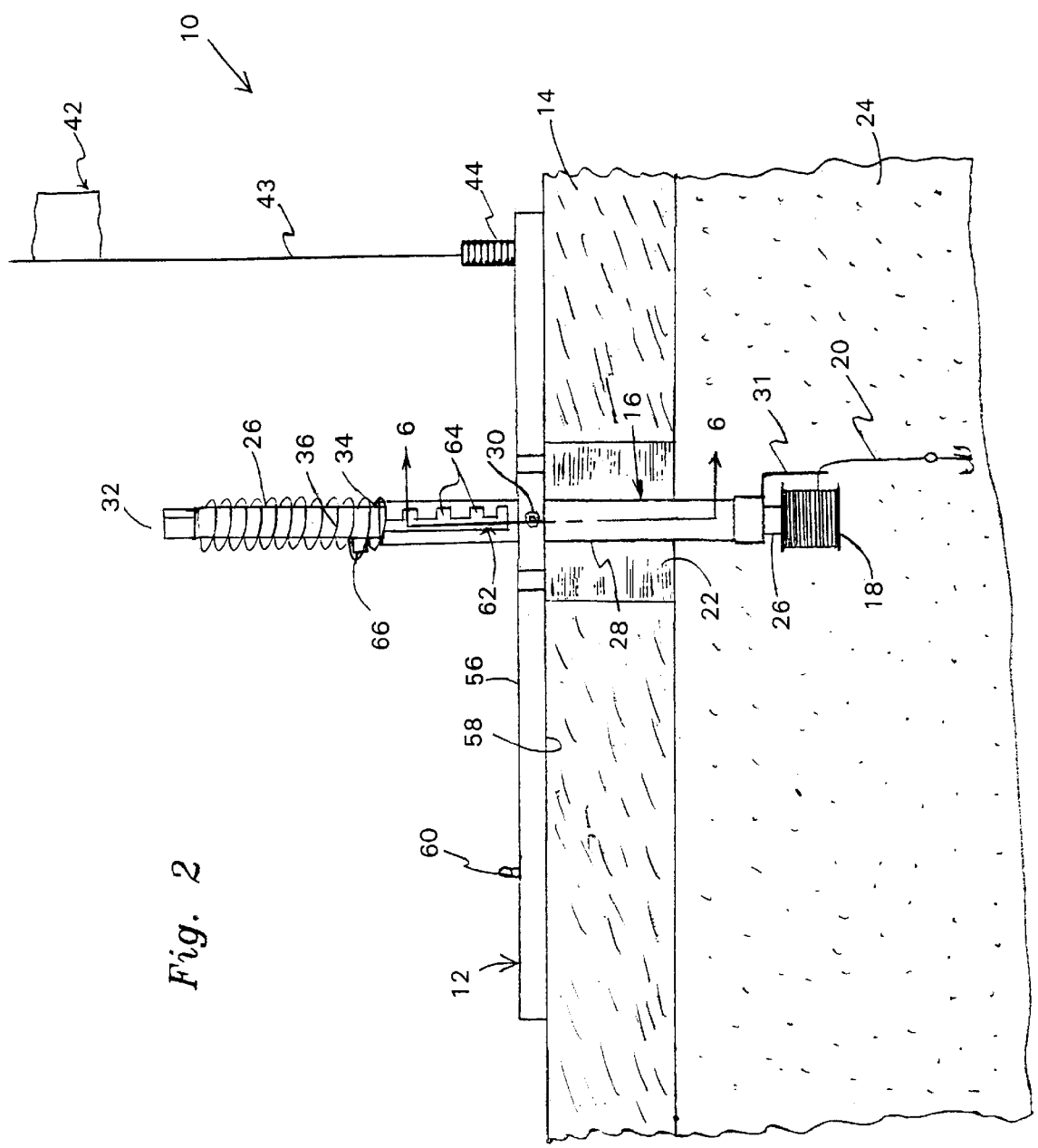
FIG. 2 shows side elevation of a tip up of the invention in the released position.

FIGS. 1 and 2 illustrate an exemplary embodiment of tip ups of the invention. Tip up 10 includes a support structure platform 12 which rests on ice 14, and an upstanding support 16 which supports a spool 18 of fishing line 20 which distends downwardly through a hole 22 in ice 14, and into the water 24. In general, support 16 comprises a shaft 26 and a collar 28. Spool 18 is fixedly mounted to shaft 26 for rotation with the shaft. Collar 28 is mounted to platform 12 at pivot pins 30. A line guide 31 is mounted on a ring 33 which is received on the lower end of shaft 26, above spool 18, for receiving the fishing line therethrough to thus guide the line as the line pays out of spool 18. Ring 33 is received on shaft 26, rotates freely about shaft 26, and can move up and down on shaft 26 below collar 28. Line guide 31 is mounted on ring 33, and accordingly, rotates with ring 33 freely about shaft 26 and moves up and down along shaft 26 with ring 33, and below collar 28. A tee-shaped cross-handle 32 is mounted to shaft 26, preferably at or adjacent the top of the shaft.

As seen in e.g. FIG. 3, shaft 26 is mounted inside tubular collar 28 for generally free rotation within the collar, but with orientation of shaft 26 with respect to collar 28, and rotation of shaft 26 with respect to collar 28, being restricted as described below. Further, shaft 26 is mounted inside tubular collar 28 in a manner enabling movement of shaft 26 within collar 28 in a direction transverse to axes A1. Shaft 26 is supported generally at a top surface or top edge 34 of the collar by compression spring 36 which extends between top surface or edge 34 and a lower surface 38 of the cross handle. Thus, in the set-up and released configuration illustrated in FIG. 2, the combined force of the weight of shaft 26, spool 18, and line 20, along with any pull on fishing line 20 through hook 25, is applied to compression spring 36 at cross handle 32.

A signal flag 42 is mounted through flag spring 44 to platform 12, and in use is biased under cross handle 32, as shown in FIG. 1.

In the embodiment shown in FIGS. 5 and 6, pivot pins 30 extend through platform 12 and into receptacles 46 on collar 28, such that collar 28, and thus shaft 26 and spool 18, can be rotated about the e.g. horizontal axes A1 of pivot pins 30. Such rotation of collar 28, shaft 26, and spool 18 about pins 30 is used to bring the combination of collar 28, shaft 26, and spool 18 into alignment with platform 12 for storage as suggested by FIG. 5; without hindering rotation of shaft 26 inside tubular collar 28 when the tip up is being used for fishing.

As shown in FIG. 5, wherein the tip up is shown in its collapsed storage orientation, the illustrated platform is generally rectangular in shape when observed from the top, although the platform can comprise any shape which offers a suitable surface for stable engagement of the tip up against the top surface of the ice. In preferred embodiments, a longitudinally-centered portion of the platform has a generally reduced width RW. The location and width magnitude of the reduced width portion is selected generally for desired positioning of pivot pins 30 at the reduced width portion. The dimension of width RW is related to ease of grasping the tip up such as for carrying the tip up, and is a factor in specifying the lengths of pivot pins 30. Width RW should, of course, be sufficiently great to be consistent with structural requirements of the tip up in normally anticipated use environments.

As illustrated in FIG. 6, pivot pins 30 are threaded so as to engage respectively threaded side walls of apertures 48 which extend through platform 12 at the reduced width portion. Axis A1' of apertures 48 generally corresponds with axis A1 of pins 30, which axes A1 and A1' extend at a preferably perpendicular angle through longitudinal axis A2 of platform 12 as well as being perpendicular to axis A3 of collar 28 and shaft 26.

An elongate aperture 46 extends through platform 12 from a top surface 48 of the platform, to a bottom surface 50 of the platform. Aperture 46 extends generally along axis A2. Aperture 46 is sized and configured to receive support 16 and spool 18, and to accommodate rotation of the support and spool about axis A1. Aperture 46 includes enlarged opposing end portions for receiving spool 18 and cross handle 32, and an intervening elongate rectangular portion which is compatible with receiving the shaft, the spring, and the collar. The function of aperture 46 is to house the support and spool when the tip up is folded as in FIG. 5, for compact shipping and storage as well as to receive and support upstanding support 16 and spool 18 when the tip up is in use.

Mounting block 51 extends about collar 28 at the reduced width portion of platform 12, is positioned between platform 12 and collar 28, and generally fills a desired portion of aperture 46 between platform 12 and collar 28, proximate pivot pins 30. Mounting block 51 contains threaded apertures 52 for receiving threaded pivot pins 30. Threaded apertures 52 must be of sufficient depth to receive pivot pins 30, without pins 30 engaging collar 28. Additionally, the cross-sections of apertures 52 are sized to readily and snugly receive pins 30.

Threaded set screws 53 threadedly engage threaded apertures 52 and are advanced against collar 28, thereby to fixedly mount mounting block 51 to collar 28. Pivot pins 30 are threadedly advanced through apertures 54 in the platform and into threaded engagement with apertures 52 of mounting block 51. As heads 56 of pins 30 come into engagement with platform 12, further advance of pins 30 draws platform 12 into frictional engagement with mounting block 51. Such frictional engagement of platform 12 and mounting block 51 enables locking of support 16 at a desired angular position, relative to pivot pins 30, with respect to platform 12. Such angular position can be, for example, the storage position of e.g. FIG. 5 or the use position of e.g. FIG. 1.

Mounting block 51 must define sufficient strength to support and secure upstanding support 16 during normal use of tip up 10. Set screws 53 are illustrated on opposing sides of collar 28 within apertures 52 in mounting block 51.

Each set screw 53 is threaded so as to engage the threads of mounting block 51 and is inserted into aperture 52. As the set screw is installed, the rotation of the set screw is continued until secure engagement of mounting block 51 with collar 28 is achieved.

Thereafter, pivot pins 30 are inserted into apertures 48, and turned so as to engage threads of the pivot pins with threads of the mounting block at apertures 52, thus to urge platform 12 into frictional engagement with mounting block 51. Set screws 53, apertures 52, pivot pins 30 and apertures 48 are preferably mutually aligned along axes A1 and A1' when engagement and securement of the pins into apertures 48, 52 and into mounting block 51, are accomplished.

So long as mounting block 51 is securely engaged with collar 28 by set screws 53, pivot pins 30 can be rotated to secure platform 12 to mounting block 51 as described above. Likewise, pivot pins 30 can still be rotated in a direction opposite of that required for engagement to disengage mounting block 51 from platform 12. During such disengagement, block 51 and platform 12 preferably remain in contact, with reduced, if any, frictional engagement between block 51 and platform 12, and provide for rotation of support member 16 about axis A1' and with respect to platform 12.

Mounting block 51 is engaged and secured to platform 12 by the rotation of the threaded pivot pins 30 e.g. in a clockwise direction, as described above. Likewise, mounting block 51 is disengaged from platform 12 by rotation of pins 30 in e.g. a counterclockwise direction opposite that direction required to engage the pins with bock 51.

Mounting block 51 can be attached to collar 28 solely by friction between collar 28 and block 51. Mounting block 51 is generally made of a corrosion resistant material, preferably aluminum, stainless steel, plastic, or other material commonly known in the art. It is contemplated that set screws 53 can represent any fixed securement known in the art such as rivets, welds, a nut and bolt assembly, pins, or otherwise. Whatever the attachment of block 51 to collar 28, such attachment does not interfere with free angular rotation, or longitudinal movement, of shaft 26 within collar 28.

While pins 30 have been illustrated as extending through platform 12 into block 51, such pins can, in the alternative, be conventionally mounted to platform 12 so as to extend through apertures 48 in combination with being spring-biased inwardly into apertures 52 in mounting block 51.

Flag 42, wire 43, and flag spring 44 operate in combination as a signal device. Flag spring 44 is attached to the platform at a location compatible with an upper portion of wire 43 being placed under cross handle 32 when the tip up is in the set position as in FIG. 1. Wire 43 extends upwardly from spring 44 to the flag. While the illustrated embodiment depicts spring 44 mounted to platform 12, in other embodiments, flag spring 44 is mounted to platform 12 and is otherwise spring-loaded between platform 12 and flag 42. Such further embodiments enable wire 43 to be removably or fixedly attached to platform 12 while incorporating the spring 44 generally along the length of wire 43 to provide the signal function when the tip up is triggered by a fish strike.

Such spring loading can be effected by a separate spring element such as spring 44. In the alternative, such spring loading can be effected by selecting, for wire 43, a material having resilient spring properties, such as one of the class of materials known as "spring steel."

Figure 8:
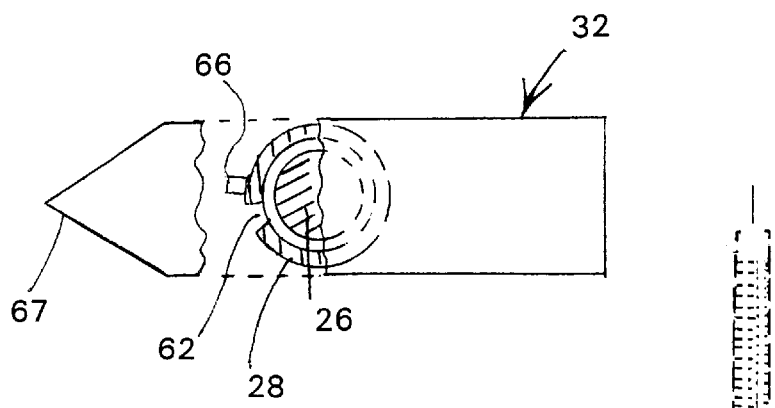
FIG. 8 is a top view, partially cut away and sectioned, of the cross handle, shaft, collar, and stud.

Referring to FIGS. 1 and 5, angular position of the length of cross handle 32, e.g. with respect to axis A3, is necessarily defined within a narrow range across platform 12 when wire 43 is engaged at lower surface 38 in the set position illustrated in FIG. 1. As indicated above, the angular position of the stud on shaft is coordinated with cross handle 32 so that stud 66 is aligned with slot 62 and a notch 64 when cross handle 32 is in a desired angular position. In preferred embodiments, collar 28 and stud 66 are angularly oriented about axis A3 such that stud 66 is aligned along shaft 26, in alignment with the marked end of cross handle 32, and slot 62 is aligned to receive stud 66 when the marked end 67 of the cross handle is oriented in the "set" position. In such orientation, the marked end 67 of the handle, stud 66, and slot 62, are all in alignment along collar 28 when the cross handle is in the set position. Such embodiment is illustrated in FIG. 8, with the stud having been turned slightly out of alignment with slot 62 in entering a notch 64 (not seen in FIG. 8).

Flag spring 44 can comprise any material which can be repeatedly flexed and which resiliently returns generally to its unbiased, e.g. unflexed, condition, e.g. FIG. 2, when a biasing force is removed. Flag spring 44 is used to resiliently mount flag 42 to the platform and to urge the flag into an upright position upon activation of the tip up when a fish pulls on the hook. In the embodiment shown in FIGS. 1, 2, and 5, the flag spring is located adjacent one end of the platform and is attached to the platform at top surface 56. Flag spring 44 can be attached elsewhere to platform 12 so long as flag 42 can be moved a sufficient distance by spring 44 to attract attention of a user when the signal device/flag is activated. Generally, flag 42 is attached to wire 43 at or adjacent an upper end of the wire, while wire 43 is attached to flag spring 44 at or adjacent a lower end of the wire.

While the signal device has been described as a flag on a spring-loaded wire, other known signaling devices are contemplated, which other signaling devices will be activated at times corresponding in general to activation of flag 42 as described below. Such known alternative signaling devices can include, for example and without limitation, a steady light, a flashing light, or a steady or intermittent audible signal. The signaling device can include use of a computer, computer chip, or other electronic device to activate the signal when a fish strikes. Such electronic device can include a transmitter which transmits the signal to e.g. a remote wireless receiver being carried or otherwise monitored by the user.

Figure 7:
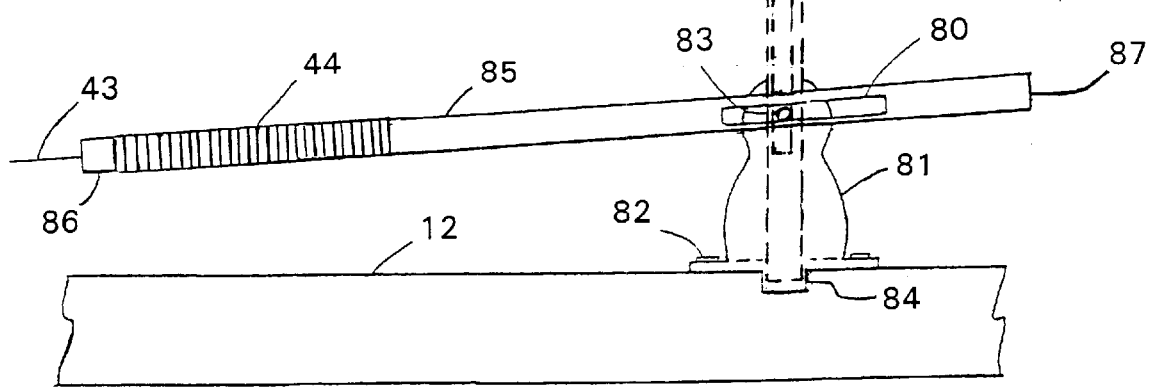
FIG. 7 illustrates a fragmentary side elevation showing a preferred signal device structure, including a slotted base of the signal device, mounting bracket, and a receptacle in the platform.

In FIG. 7, a second embodiment of a flag-type signal device and its attachment to platform 12 are illustrated. FIG. 7 focuses on the signal device proximate the area of attachment to platform 12. A flag 42 (not shown) is disposed on the distal end of the wire as in FIGS. 1 and 2. The signal device, as depicted, includes wire 43, spring 44, primary shaft 85, secondary shaft 86, and mounting bracket 81. In contrast to the signal device illustrated in FIGS. 1, 2 and 5, spring 44 in FIG. 7 is disposed between wire 43 and shaft 85, with optional secondary shaft 86 between spring 44 and wire 43. In the preferred embodiment, secondary shaft 86 is deleted whereby spring 44 is attached directly to wire 43 as in FIGS. 1, 2, and 5. Secondary shaft 86 and primary shaft 85, where both are used, are independent members which are joined by spring 44. Secondary shaft 86 and primary shaft 85, in the preferred embodiment, are separate segments in order to enable spring 44 to function without unnecessary structural restraint.

However, in other embodiments, the combination of secondary shaft 86 and primary shaft 85 can be defined by a continuous member if the unity of the shafts does not inhibit the operation of spring 44. Further, a singular shaft of rubber or other resiliently flexible material can be used to provide sufficient support and resilient flexibility to provide the functionality of each member as otherwise described herein, with or without incorporation of a spring as a separate element.

In an exemplary embodiment, aperture 80 extends through shaft 85 proximate end 87 of shaft 85 remote from flag 42. Aperture 80 defines a longitudinal slot in shaft 85 for receiving mounting bracket pin 83. Mounting bracket pin 83 is secured to mounting bracket 81. Mounting bracket pin 83 can permissively rotate about its own longitudinal axis but must be securely mounted on bracket 81 so as to support shaft 85, spring 44, wire 43, and flag 42. In lieu of mounting bracket pin 83, other attachment means known by those skilled in the art can be used.

Mounting bracket 81 is attached and secured to platform 12 by mounting bracket screws 82. Mounting bracket screws 82 can be replaced with any attachment means known in the art which will attach mounting bracket 81 to platform 12. In the embodiment of FIG. 7, platform 12 contains receptacle 84 for receiving end 87. In this embodiment, the signal device function remains the same as elsewhere detailed herein. However, the method in which the signal device is attached to platform 12 is varied. By including aperture 80 in signal device shaft 85, the signal device is selectively securable by the user of the tip up in either the storage position shown in solid outline in FIG. 7, or in the "in use" position shown in dashed outline. Aperture 80 enables movement of the signal device between the storage and "in use" positions.

Shaft 85 is movable in all directions confined only by aperture 80 which is typically rectangular, elliptical, or similarly shaped. In the illustrated embodiment, pin 83 generally resists rotational movement of shaft 85 about an upright axis, and thereby pin 83 limits movement of shaft 85 to movement about the generally horizontal axis defined by pivot pin 83.

A plurality of mounting brackets can be utilized in the assembly. Likewise, a plurality of mounting configurations are also contemplated. As shown in FIG. 7, mounting pin 83 is received in aperture 80 whereby shaft 85 can be moved longitudinally of the shaft, thus to move distal end 87 toward pin 83, whereby the shaft can be rotated about pin 83 to bring distal end 87 of the shaft into alignment with receptacle 84. When end 87 is positioned above receptacle 84, end 87 can move downwardly into receptacle 84, thus temporarily fixing the signal apparatus in a generally upright orientation as shown in dashed outline in FIG. 7.

While platform surface 58 is resting on ice 14 as shown in FIG. 2, end 87 remains in receptacle 84 under the influence of gravity. Flag 42 is then engaged under cross handle 32, along with bending of spring 44, as before. End 87 remains secured in receptacle 84 while the tip up is being used, whether in the set position as illustrated in FIG. 1, during the period the user is waiting a fish strike, during release of the tip up due to a fish strike, and after the tip up has operated as illustrated in FIG. 2. End 87 is removed from receptacle 84, and the entire signal device is laid down as shown in FIGS. 5 and 7, when tip up 10 is being stored or transported.

Flag hook 60 is mounted on top surface 56 of platform 12. Hook 60 is open toward top surface 56 and receives a top portion of wire 43 thus to hold wire 43 and flag 42 down generally against the platform for shipping and storage of the tip up as shown in FIG. 5.

As seen in e.g. FIGS. 1 and 2, the angular orientation of cross handle 32 on shaft 26 is coordinated with the angular position of stud 66 on shaft 26, both with respect to axis A3 of the shaft, such that cross handle 32 extends transverse to the length of wire 43 when the upper end of the wire is brought down against shaft 26 and stud 66 has been set in a notch 64. Wire 43 can accordingly be moved downwardly and engaged under cross handle 32 at lower surface 38 as illustrated in FIG. 1.

In exemplary embodiments, cross handle 32 possesses at least one marked end 67, traverse to shaft 26, which is angled, painted, or otherwise marked for identification, and which is directly aligned with stud 66 along axes A3 so that the marked end 67 of cross bar 32 is in direct axial alignment with stud 66. In this exemplary embodiment, stud 66 is easily aligned visually by the user with any of notches 64 in slot 62 when the tip up is biased into set position.

Line guide 31 generally comprehends a slotted stem depending from ring 33, which enables fishing line accepted from the spool to be fed through the slot. The line guide and ring are generally made of rust proof material, for example aluminum, stainless steel, plastic, or other material commonly known in the art. Primary function of the line guide is to feed line from spool 18 when a fish takes the bait, or nibbles on the bait and/or hook. Line guide 31 also assists in keeping the fishing line from becoming entangled about spool 18 and/or collar 28 and/or shaft 26. In addition, the free rotation of ring 33 about axis A3 and shaft 26 enables the line guide, which is mounted to ring 33, to rotate freely about axis A3 and shaft 26. Accordingly, as line is drawn from the spool, the line guide rotates into alignment between the spool and the direction from which line is being drawn from the spool. As a result, the line guide automatically aligns itself with the direction from which line is being withdrawn, such that the line is drawn from the spool, through the line guide generally along a radial axis of the spool, allowing for minor misalignment therefrom related to the thickness of the roll of windings of line on the spool. In keeping with the mounting of ring 33 on shaft 26, line guide 31 is free both to rotate about shaft 26, and to move up and down on shaft 31, e.g. in directions parallel to axis A3.

Referring to FIGS. 1 and 2, collar 28 extends along axis A3' and, in use, is generally disposed in an upright orientation, thus to extend through hole 14 in the ice. As illustrated, collar 28 includes a slot 62 extending longitudinally of the collar and downwardly from top edge 34 of the collar. A plurality of notches 64 extend transversely from slot 62, thus to provide for communication between slot 62 and notches 64. In preferred embodiments, notches 64 extend generally horizontally from slot 62 when the tip up is in the upright, set orientation shown in FIGS. 1 and 2.

As seen in FIGS. 1–4, a stud 66 extends outwardly from shaft 26 at an intermediate locus along the length of the shaft. The longitudinal positioning of stud 66 on shaft 26 is selected such that, when compression spring 36 is in its generally uncompressed condition as in FIG. 2, the stud is between top edge 34 of the collar and cross handle 32 of the shaft. A further condition of location of stud 66 is that, when spring 36 is compressed as to set the tip up as in FIG. 1, stud 66 can be guided along slot 62 and into one of notches 64.

Stud 66 can be as simple as a piece of metal rod welded or otherwise affixed to the side of shaft 26, or a piece of metal rod inserted into a cooperating aperture in shaft 26. It is critical that stud 66 be sufficiently rigidly affixed to shaft 26 to act as an engagement interface engaging shaft 26 with respect to collar 28 at a selected one of the respective notches 64.

Figure 3:
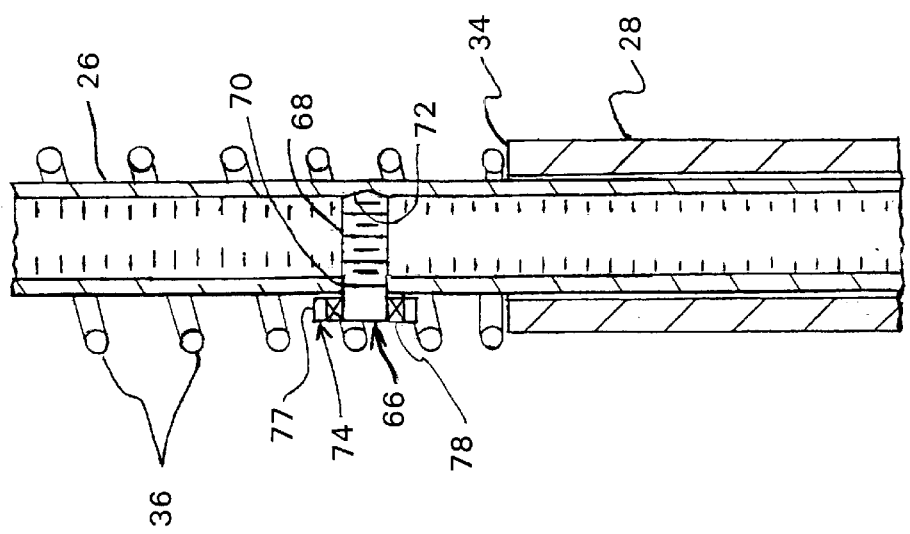
FIG. 3 is a fragmentary cross-section of portions of the collar, the shaft, and the spring, along with a cross-section of one embodiment of the stud, illustrating interactions of the collar, shaft, spring, and stud.

The stud illustrated in substantial detail in FIG. 3 shows a threaded shaft 68 threaded into a correspondingly threaded aperture 70 in tubular shaft 26, and wherein the distal end of stud 66 is embedded into a recess 72 in the opposing wall of shaft 26. In the alternative, stud 66 and the respective aperture in shaft 26 can be so sized and configured that stud 66 is retained in the aperture by a friction fit.

A variety of configurations can be used for cross-section of shaft 26. Shaft 26 can be, for example and without limitation, a solid rod as shown in FIG. 6, a hollow thin-walled tube where weight reduction is desired as in FIG. 3, or a thick-walled tube where a combination of weight control and strength is desired. Where shaft 26 is e.g. a solid rod, aperture 70 extends into shaft 26 a sufficient distance that shaft 68 of stud 66 can interface with a suitable length of aperture 70 to stabilize stud 66 in the aperture. In that regard, aperture 70 can extend into shaft 26 as a blind aperture, or can extend entirely through the thickness of shaft 26.

Whatever the configuration of shaft 26, stud 66 can interface with aperture 70 with a threaded fit, a forced friction fit, or any other known method of locking a stud and aperture together in the available space.

As illustrated in FIGS. 2 and 3, spring 36 is mounted over shaft 26, between cross handle 32 and top edge 34 of collar 28, and is sized with sufficient diameter clearance, and the length of extension of stud 66 from shaft 26 is so controlled, as to enable spring 36, during any compression or move of resilient restoration, to pass over the stud without the stud interfering with such movement of the spring, or the spring interfering with movement of the stud downwardly e.g. into slot 62.

In an embodiment not shown in the drawings, spring 36 can be mounted inside a hollow such shaft 26.

Further, while spring 36 has been described as a compression spring, a tension spring can as well be used, with suitable modification of restraint structure to accommodate the change from a compression spring to a tension spring.

Size and strength of spring 36 is selected such that the uncompressed, expanded and generally resting condition of the spring, though bearing the weight of shaft 26 and spool of line 18, maintains stud 66 above the top edge 34 of collar 28, while in the compressed condition, the restorative force on the spring is sufficient to firmly set the hook without tearing the hook out of the fish's mouth. Thus, when the stud is set in one of notches 64, the restorative force on spring 36 is about 1 pound to about 30 pounds, preferably about 4 pounds to about 22 pounds. In an exemplary embodiment, the force required to set the stud in the first notch closest to the top of collar 28 was 7 pounds of force; and the force required to set the stud in the last notch, farthest from the top of the collar, was 18 pounds of force.

Referring again to FIG. 3, stud 66 is illustrated with an optional head 74, the head being generally characterized as an enlarged engagement surface for engaging corresponding engagement surfaces of notches 64. Whether or not stud 66 includes a head, the portion of the stud which extends outwardly from shaft 26 operates as an engagement surface of the stud which engages a corresponding engagement surface 76 of collar 28 at the upper edge of a respective notch 64. It is this engagement of stud 66 against collar 28 at notch 64 which holds the shaft in the desired set position when the tip up is set up on the ice and waiting for a fish to bite on the hook.

The engagement of stud 66 against engagement surface 76 of the respective notch can be e.g. a frictional engagement or a rolling engagement. A frictional engagement exists where stud 66 presents a non-rolling surface to engagement surface 76, for example where stud 66 is a solid shaft or tube. A rolling engagement exists where e.g. a rotating wheel 77 is mounted at the exposed outer end of stud 66 so as to rotate with respect to the shaft of stud 66. Such rotating wheel 77 is desirably mounted to the stud shaft by a bearing such as bearing 78 illustrated in FIGS. 3 and 4.

Collar 28 and shaft 26 can be made of any suitable materials, but in preferred embodiments, preferred materials are metals such as aluminum or stainless steel. Certain polymeric materials can also be used, and are selected for tolerance of the cold use conditions in which tip ups are used. In that regard, there can be mentioned, for example and without limitation, selected polyesters, polyamides, and higher density polyethylenes. Typically but not necessarily, the material used for one of shaft 26 and collar 28 is also used in making the other of shaft 26 and collar 28.

Generally, the length of collar 28 is less than the length of shaft 26. Structures are selected for use in making collar 28 and shaft 26 so that shaft 26 is received inside collar 28 with a close but loose fit, whereby shaft 26 can freely rotate within collar 28 while being closely confined in general axial alignment with collar 28 such that axis A3' of shaft 26 generally coincides with axis A3 of collar 28. Collar 28 also allows for relatively and generally unrestricted movement of shaft 26 in both e.g. up and down longitudinal directions along the length of collar 28. Collar 28 is securely mounted for pivotation with respect to platform 12 by pivot pins 30. Pivot pins 30 enable the user to rotate or adjust the collar as desired about pins 30 into a set-up configuration such as for using the tip up for fishing (FIGS. 1 and 2), and into a storage or shipping configuration as illustrated in FIG. 5.

In a first family of conventional tip ups, the shaft is free to rotate within the collar when the tip up is set for fishing. Thus, when a fish takes the bait such as at the hook or other fishing tackle located at the end of the line, and thus pulls on the line, the pull on the line exerts a rotational force on the spool and thus on the shaft such that the shaft turns freely inside the collar, this free-turning being known as free-spooling. Free spooling provides for generally unrestricted release of line, subject to any friction associated with rotation of the shaft inside the collar, as the fish swims away. As the shaft turns, the tee-shaped cross handle at the top of the shaft turns with turning of the shaft. The turning of the cross handle rotates the cross handle from its overlying position with respect to an upper portion of the wire, thus to release the flag from its constraint under the cross handle. As the flag is released from under the cross handle of the shaft, the spring at the base of the flag returns to an upright orientation, and thus raises the flag. The resulting upright orientation of the flag is a signal to the fisherman that a fish may be available for catching. The fisherman moves to the tip up, and hopefully pulls in a fish.

In a second family of known tip ups, an upright shaft is spring loaded to a collar, whereby the spring jerks the shaft upwardly when the shaft is rotated in the collar. The spool is mounted on a horizontal shaft under the water, the horizontal shaft being mounted to the upright shaft. When a fish takes the bait, the spool pays out a significant length of line, and then stops rotating and paying out line, before transferring the force, which is pulling on the line, to the upright shaft, thereby to rotate the upright shaft and set the hook. Thus, in this family of tip ups, substantial line is paid out before the hook is set, and once the hook is set, rotation of the spool is prevented whereby the spool is no longer able to pay out any more line.

Returning now to the invention, the basic concept of the invention is to set the tip up for a rapid hooking jerk response promptly after a fish begins swimming away with the bait, while enabling the fish to take additional line after the hook is set. Accordingly, a tip up of the invention is set for fishing as follows. First the user takes the tip up out of the storage configuration illustrated in FIG. 5 by rotating the combination of collar 28, shaft 26, and spool 18 about pins 30 to the set-up configuration illustrated in FIG. 2. The user then baits the hook as desired, and sets the tip up on the ice with spool 18, collar 28, and shaft 26 extending downwardly into the water through ice hole 22. That leaves collar 28, spring 36, shaft 26, and cross handle 32 extending upwardly from the ice hole.

The user then grasps cross handle 32, rotates shaft 26, as necessary, to bring stud 66 into alignment with slot 62, and pushes the shaft downwardly in collar 28, against the resistance of compression spring 36. As the shaft is pushed downwardly in the collar against the resistance of spring 36, stud 66 moves downwardly in slot 62. The user selects a desired notch 64, and rotates the shaft to bring the stud into the desired notch when the stud is horizontally aligned with the notch. Restorative forces on compression spring 36 urge the stud upwardly toward engagement surface 76 of collar 28 at the top edge of the respective selected notch. The user then releases the downward force whereby compression spring 36 urges stud 66 upwardly into engagement with engagement surface 76 of collar 28 at the top edge of the notch. With the stud thus engaged in a selected notch as in FIG. 1, the user grasps wire 43 and places an upper portion of the wire under cross handle 32 against the restorative force of flag spring 44. The tip up is thus set, and ready to respond to a fish taking the bait and respectively drawing line from spool 18.

In the given set configuration, spring 36 is exerting an upward force on shaft 26, which upward force is being resisted by the engagement of stud 66 against engagement surface 76 at the upper edge of the respective notch. The magnitude of the upward force, and thus the magnitude of the jerk when stud 66 is released from the notch, is directly related to the degree of compression of spring 36. The degree of compression of spring 36 depends which of the notches 64 is engaged by stud 66. The lower the notch, the greater the degree of compression of spring 36, the greater the magnitude of the jerk force applied by spring 36, as well as the greater the distance of the jerk, when stud 66 is released from the notch. Thus, for a more aggressive jerk, stud 66 is engaged in a lower notch. For a less aggressive jerk, stud 66 is engaged in a relatively upper notch.

When a fish pulls on hook 25, thus on fishing line 20 and spool 18, such pull is resisted by any friction between stud 66 and the engagement surface of the collar at the respective notch. Where no provision is made for rotation of stud 66, the friction is controlled by principles of sliding friction between stud 66 and engagement surface 76. Where provision is made for facile rotation of a surface of stud 66 which is engaged with engagement surface 76, such as by bearing mounted wheel 77, the friction is controlled by principles of rolling engagement friction.

Thus, where stud 66 incorporates a bearing as at bearing 78 of FIG. 3, the force required to release stud 66 from engagement with the notch and to thereby release the stud into slot 62 is relatively independent of the magnitude of the resistance being exerted by compression spring 36, and thus relatively independent of the selection of the notch into which the stud is received. By contrast, where stud 66 does not provide for rolling engagement with surface 76, the force required to release stud 66 from engagement with the notch and to thereby release the stud into slot 62 is directly related to the magnitude of the resistance being exerted by compression spring 36.

Correspondingly, where release of the stud from engagement with the collar comprises rolling engagement of the stud with respect to the engagement edge of the collar at the notch, the magnitude of force required to effect release of the stud from the collar is generally independent of the relative position of the notch along the length of the slot, while magnitude of the upward jerk is related to the relative position of the notch along the length of the slot.

By contrast where release of the stud from engagement with the collar comprises frictional sliding engagement of the stud with respect to the engagement edge of the collar at the notch, the magnitude of force required to effect release of the stud from the respective notch is generally affected by the relative position of the respective notch along the length of the slot, and magnitude of the upward jerk is related to the relative position of the respective notch along the length of the slot.

When a fish takes the bait on the hook, e.g. begins to swim away with the bait, the pull on the line tends to cause rotation of shaft 26 inside collar 28, against whatever resistance is applied at the interface between stud 66 and engagement surface 76 in the notch, coupled with residual friction related to rotation of shaft 26 inside collar 28. Magnitude of such resistance can be somewhat controlled by the user by selection of notch 64 and by selection of sliding or rolling engagement design of stud 66. Notches 64 extend from slot 62 in a direction compatible with releasing stud 66 from a respective notch when shaft 26 is rotating in a direction consistent with spool 18 paying out fishing line 20.

Assuming the pull force is great enough to overcome the sliding friction or rolling resistance between stud 66 and engagement surface 76 at the top of the respective notch, shaft 26 begins to rotate. As the fish pulls on the hook, whereby spool 18 and shaft 26 rotate responsively to thereby begin paying out line, stud 66 moves along engagement surface 76 toward slot 62. When stud 66 moves out of the respective notch 64 and into slot 62, the restorative forces on spring 36 cause the spring to expand rapidly, thereby applying a jerk movement to shaft 26, which is translated through shaft 26 to spool 18, bringing spool 18, and thus the respective hook 25 on the end of the line, up with it.

The rapid upward movement of the line and hook sets the hook, hopefully in the mouth of the fish. It is important that the force of expansion of compression spring 36 be great enough to exert a sharp pull or jerk on the hook when stud 66 leaves notch 64 and wherein the pull or jerk accelerates substantially faster than the unwinding of line from the spool accelerates in response to the mass or restraint of the fish, thus to exert an actual jerk impulse force at the hook sufficient to assist in setting the hook. The net result to the fish is a rapid, forceful jerk on the line when the fish first pulls hard enough on the bait or hook to cause sufficient rotation of shaft 26 to release stud 66 from the respective notch. This rapid forceful jerk operates much like the fisherman's manual upward jerk to set the hook as he holds a rod in his hands while fishing in an open water, e.g. not ice fishing, setting.

So long as stud 66 remains in slot 62, shaft 26 and spool 18 are free to rotate with respect to collar 28 only to the extent of movement of stud 66 toward slot 62. Thus, it is critical that stud 66 be positioned along the length of shaft so as to be positioned above top edge 34 of collar 28 when compression spring 36 has completed its upward expansion as it jerks shaft 26 upwardly. With stud 66 positioned above collar 28 at completion of the upward jerk expansion, shaft 26 can rotate in collar 28 without restriction other than the friction associated with free rotational engagement of the shaft inside collar 28.

Thus, tip up 10 applies a substantial hook-setting jerk shortly after the fish begins taking line. The length of line 20 which can be taken, and thus the distance of rotation of spool 18 and shaft 26 before activating the jerk, generally corresponds with the distance "D" which must be traversed by stud 66 before restorative forces on spring 36 complete the release of the stud from the notch. In general, distance "D" can be measured between the edge of slot 62 and the center of stud 66 in the notch. A longer distance can be effected by setting stud 66 against the blind end of the respective notch 64. A lesser distance can be effected by setting stud 66 closer to slot 62. The range of potential distances "D" can be further controlled by specification of the length of notch 64, from slot 62 to the blind end of the notch. Overall, distance "D" is typically between about 0.25 inch and about 1 inch. Distance "D" of less than 0.25 inch bears an undesirable level of risk of inadvertent release of the stud from the respective notch before a fish interacts with the bait. Distance "D" greater than 1 inch corresponds with notches of such length dimension to the blind end of the notch that a substantial fraction of the circumference of collar 28 is cut away in defining the notches, thereby potentially compromising strength of collar 28.

Once the set stud 66 reaches slot 62 in a disengagement, decoupling action, and while shaft 26 is being jerked upwardly by compression spring 36, rotation of shaft 26 is confined by the width of slot 62. Thus, shaft 26 is essentially restricted against rotation while spring 36 is effecting the upward jerk. However, once the upward jerk has raised stud 66 above top edge 34 of the collar, shaft 26 is free to rotate with respect to collar 28, and can rotate freely with respect to collar 28.

Figure 4:
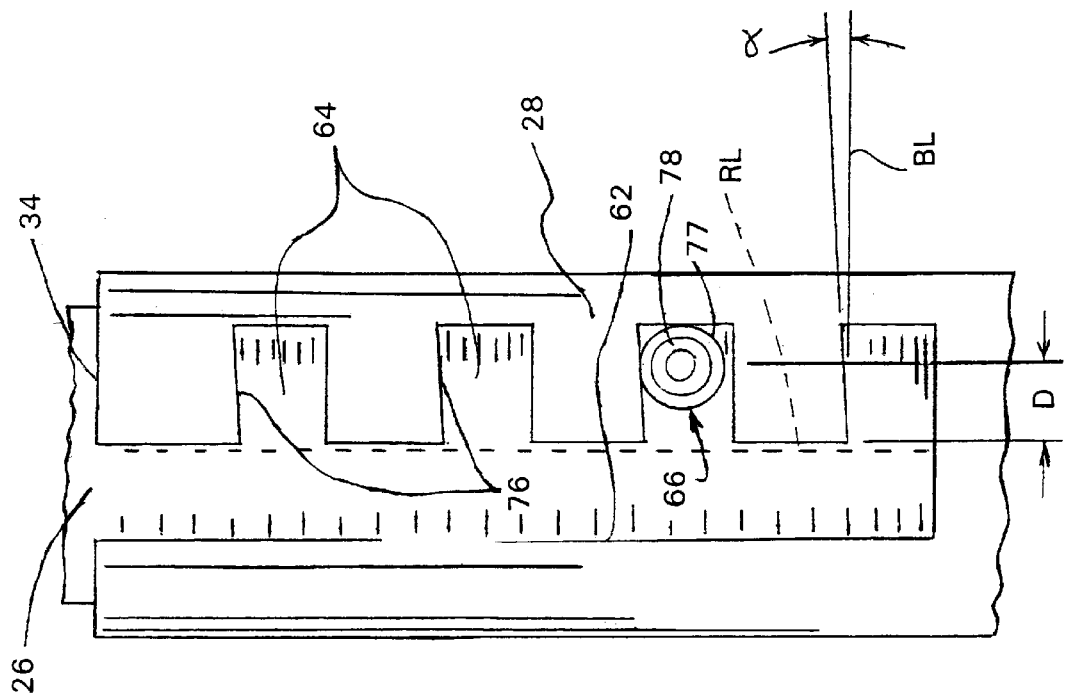
FIG. 4 is a fragmentary side elevation illustrating a second embodiment of the notches.

Further control of release of stud 66 can be effected by design of the respective notches 64 at engagement surfaces 76. Referring to FIG. 4, starting at slot 62, engagement surface 76 extends upwardly at an angle α from an imaginary baseline BL which is perpendicular to slot 62 and thus to an imaginary reference line RL which is parallel to axis A3 of shaft 26. Magnitudes of angle α generally up to about 10 degrees can be used, especially in combination with rolling engagement, in order to automatically urge stud 66 toward the blind end of the notch and into an enhanced engagement with the collar at the blind end, whereby the upward pull of compression spring 36 assists in retaining stud 66 in the respective notch until such time as a fish pulls on the line and thereby begins rotation of spool 18 and shaft 26. Preferred magnitude of angle α is about 2 degrees to about 10 degrees. Where the angle is less than about 2 degrees, little benefit is seen in applying a such angle α. Where the angle is greater than about 10 degrees, the magnitude of the angle can so increase the pull force at hook 25 required to release stud 66 that desired activation of the tip up operation is compromised. Angle α can be greater than 10 degrees where such increased release force is desired, or to balance the ease of release associated with a bearing-mounted head on stud 66. In any event, angle α is typically not greater than about 25 degrees.

While the invention has been described in terms of slot 62 and notches 64 being defined in collar 28, with corresponding stud 66 in shaft 26, such imagery can be reversed such that slot 62 and notches 64 are defined in shaft 26, and stud 66 is defined in collar 28. In such configuration, the engaging end of stud 66 extends inwardly into shaft 26, and engagement of stud 66 in a notch 64 comprises slot 62 moving downwardly past, and into engagement with, a relatively stationary stud 66, whereas in the embodiments illustrated in the drawings, a mobile stud 66 moves downwardly past, and into engagement with, relatively stationary slot 62 and notches 64.

In alternative embodiments, not shown, a collar adapter can be securely mounted to collar 28 by any known means, in alignment with apertures 54 in platform 12, the collar adapter bearing pin receptacles 46. In such embodiment, no holes need be made in collar 28 to accommodate reception of pins 30 into receptacles 46 since receptacles 46 are embodied in the adapter.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. An ice fishing tip up, comprising:
   (a) support structure for supporting said tip up on a surface of ice through which a user wishes to fish;
   (b) a collar mounted to said support structure, said collar being mounted for extension along a first axis transverse to said support structure and toward a hole in the ice;
   (c) a shaft mounted in said tip up, along a second axis generally coinciding with the first axis, said shaft being mounted for rotation with respect to said collar and being movable generally along the second axis relative to the collar between a released position and one of a plurality of set positions;
   (d) a spring biasing said shaft against movement of said shaft with respect to said collar toward a respective one of the set positions, thus to jerk said shaft upwardly relative to said collar;
   (e) a stop on one of said collar and said shaft mounted for temporarily coupling said shaft and said collar together when said shaft is moved to the set position against biasing force of said spring; and
   (f) a spool adapted to carry fishing line and corresponding hook on the fishing line, said spool being mounted for rotation about a third axis concurrent with rotation of said shaft about the second axis,
      said stop temporarily coupling said shaft and said collar together when said shaft is moved to the set position such that, upon tension being applied to the fishing line, said spool rotates a limited distance sufficient to release said stop from the temporary coupling, whereupon said spool is prevented from rotating while said spring retracts said stop to a position above said collar, whereupon said spool can rotate freely.

2. An ice fishing tip up as in claim 1, said spool being mounted for free-spool rotation about the third axis concurrent with rotation of said shaft about the second axis.

3. An ice fishing tip up as in claim 1, said spool being free to rotate without active restraint, and thus to pay out fishing line, after said spring jerks said shaft upwardly.

4. An ice fishing tip up as in claim 1, a slot extending longitudinally of said collar, a plurality of notches extending transversely from the direction of extension of the slot, said stop comprising a stud which traverses along the slot when said shaft is moved to the set position against the biasing force of said spring, and with traverse into a selected one of the notches, whereby said spring biases said stud against said collar at an edge of the respective slot.

5. An ice fishing tip up as in claim 4, said collar having a top edge, the slot extending downwardly from the top edge of said collar, said tip up being effectively set for hooking fish by turning said shaft, as necessary, about the second axis to bring said stud into alignment with the slot, pushing said shaft downwardly with respect to said collar and against biasing resistance force of said spring, whereby said stud progresses downwardly in the slot, turning said shaft with respect to the second axis and thereby engaging said stud in a said notch, and releasing downward force on said shaft whereby said stud engages said collar at an engagement edge of said collar at the respective notch.

6. An ice fishing tip up as in claim 1, said stop accommodating uncoupling of said shaft and said collar when a fish pulls on the hook, resulting in the shaft, and thus the hook, being jerked upwardly by a biasing force of said spring, said spool being free to rotate without active restraint, and thus to pay out line, after said spring jerks said shaft upwardly.

7. An ice fishing tip up as in claim 5, said stop accommodating uncoupling of said shaft and said collar when a fish pulls on the hook, resulting in the shaft, and thus the hook, being jerked upwardly by the biasing force of said spring, said spool being free to rotate without active restraint, and thus to pay out line after said spring jerks said shaft upwardly.

8. An ice fishing tip up as in claim 7, release of said stud from engagement with said collar comprising frictional sliding of said stud against said collar at the respective engagement edge of the collar at the respective notch, whereby magnitude of the upward jerk and magnitude of the sliding force both strongly correlate with the relative position of the respective notch along the length of the slot.

9. An ice fishing tip up as in claim 7, release of said stud from engagement with said collar comprising rolling engagement of said stud against said collar at the respective engagement edge of the collar at the respective notch, whereby magnitude of force required to effect release of said stud from the respective notch is generally independent of the relative position of the notch along the length of the slot, while magnitude of the upward jerk strongly correlates to the relative position of the notch along the length of the slot.

10. An ice fishing tip up as in claim 6, said spool being restrained against rotating and thus paying out line concurrent with said spring jerking said shaft upwardly.

11. An ice fishing tip up as in claim 1 wherein said spool can rotate about the third axis a limited distance before said spring jerks said shaft upwardly, wherein said spool is generally restrained from rotation while said spring is jerking said shaft upwardly, and wherein said spool can freely rotate and pay out line, after said spring jerks said shaft upwardly.

12. An ice fishing tip up, comprising:
   (a) support structure for supporting said tip up on a surface of ice through which a user wishes to fish;
   (b) a collar mounted to said support structure, said collar being mounted for extension along a first axis transverse to said support structure and toward a hole in the ice;

(c) a shaft mounted in said tip up, along a second axis generally coinciding with the first axis, said shaft being mounted for rotation with respect to said collar and being movable generally along the second axis relative to the collar between a released position and one of a plurality of set positions;

(d) a spring biasing said shaft against movement of said shaft with respect to said collar toward a respective one of the set positions;

(e) a stop mounted on one of said collar and said shaft and extending toward the other of said collar and said shaft, the other of said collar and said shaft comprising a slot extending longitudinally thereof, and a plurality of notches extending transversely from the direction of extension of the slot, said stop being compatible with traverse of said stop along the slot when said shaft is moved from the released position to a respective one of the set positions against the biasing force of said spring, and with traverse of said stop into a selected one of the notches at the set position, whereby said spring biases said stop against said collar at an engagement edge of said collar at the respective notch, release of said stop from engagement with said collar, and corresponding uncoupling of said shaft and said collar from each other when a fish pulls on the hook, resulting in said spring exerting an upward jerk on the shaft, and a corresponding upward jerk on the hook, such release of said stop from engagement with said collar comprising rolling engagement of said stop against the respective edge of said collar at the respective notch, whereby magnitude of force required to effect release of said stop from the respective notch is generally independent of which of the notches is selected for the set position of said stop;

(f) a spool adapted to carry fishing line and corresponding hook; and (g) a signal device activated when a fish pulls on the hook.

13. An ice fishing tip up as in claim 12, said spool being mounted for free-spool rotation about the third axis concurrent with rotation of said shaft about the second axis.

14. An ice fishing tip up as in claim 12, said spool being free to rotate without active restraint, and thus to pay out fishing line, after said spring jerks said shaft upwardly.

15. An ice fishing tip up as in claim 12, said stop comprising a stud compatible with traverse of said stud along the slot when said shaft is moved to the set position against the biasing force of said spring, and with traverse into a selected one of the notches, whereby said spring biases said stud against said collar at an edge of the respective slot.

16. An ice fishing tip up as in claim 15, said collar having a top edge, the slot extending downwardly from the top edge of said collar, said tip up being effectively set for hooking fish by turning said shaft, as necessary, about the second axis to bring said stud into alignment with the slot, pushing said shaft downwardly with respect to said collar and against biasing resistance force of said spring, whereby said stud progresses downwardly in the slot, turning said shaft with respect to the second axis and thereby engaging said stud in a said notch, and releasing downward force on said shaft whereby said stud engages said collar at an engagement edge of said collar at the respective notch.

17. An ice fishing tip up as in claim 12, said stop accommodating uncoupling of said shaft and said collar when a fish pulls on the hook, resulting in the shaft, and thus the hook, being jerked upwardly by a biasing force of said spring, said spool being free to rotate without active restraint, and thus to pay out line, after said spring jerks said shaft upwardly.

18. An ice fishing tip up as in claim 16, said stop accommodating uncoupling of said shaft and said collar when a fish pulls on the hook, resulting in the shaft, and thus the hook, being jerked upwardly by the biasing force of said spring, said spool being free to rotate without active restraint, and thus to pay out line after said spring jerks said shaft upwardly.

19. An ice fishing tip up as in claim 12 wherein said spool can rotate about the third axis a limited distance before said spring jerks said shaft upwardly, wherein said spool is generally restrained from rotation while said spring is jerking said shaft upwardly, and wherein said spool can freely rotate and pay out line, after said spring jerks said shaft upwardly.

20. An ice fishing tip up as in claim 12, said stop comprising a stud mounted on said shaft, the engagement edge of said collar at the respective notch defining an angle $\alpha$ of about 2 degrees to about 10 degrees with respect to a perpendicular measured from a line parallel to the first axis, whereby the biasing force of said spring urges said stud away from the slot and into enhanced engagement with said collar at a distal end of the notch.

21. An ice fishing tip up, comprising:

(a) a support structure for supporting said tip up on a surface of ice through which a user wishes to fish;

(b) a collar mounted to said support structure, said collar being mounted for extension along a first axis transverse to said support structure and toward a hole in the ice;

(c) a shaft mounted in said tip up, along a second axis generally coinciding with the first axis, said shaft being mounted for rotation with respect to said collar and being movable generally along the second axis relative to the collar between a released position and one of a plurality of set positions;

(d) a spring biasing said shaft against movement of said shaft with respect to said collar toward a respective one of the set positions;

(e) a stop mounted on one of said collar and said shaft and extending toward the other of said collar and said shaft, the other of said collar and said shaft comprising a slot extending longitudinally thereof, and a plurality of notches extending transversely from the direction of extension of the slot, said stop being compatible with traverse of said stop along the slot when said shaft is moved from the released position to a respective one of the set positions against the biasing force of said spring, and with traverse of said stop into a selected one of the notches as the set position;

(f) a spool adapted to carry fishing line and corresponding hook; and (g) a signal device activated when a fish pulls on the hook.

22. An ice fishing tip up as in claim 21, said spool being mounted for free-spool rotation about a third axis concurrent with rotation of said shaft about the second axis.

23. An ice fishing tip up as in claim 21, said spool being free to rotate without active restraint, and thus to pay out fishing line, after said spring jerks said shaft upwardly.

24. An ice fishing tip up as in claim 21, said stop comprising a stud which traverses along the slot when said shaft is moved to the set position against the biasing force of said spring, and with traverse into a selected one of the notches, hereby said spring biases said stud against said collar at an edge of the respective slot.

25. An ice fishing tip up as in claim 24, said collar having a top edge, the slot extending downwardly from the top edge of said collar, said tip up being effectively set for hooking fish by turning said shaft, as necessary, about the second axis to bring said stud into alignment with the slot, pushing said shaft downwardly with respect to said collar and against biasing resistance force of said spring, whereby said stud progresses downwardly in the slot, turning said shaft with respect to the second axis and thereby engaging said stud in a said notch, and releasing downward force on said shaft whereby said stud engages said collar at an engagement edge of said collar at the respective notch.

26. An ice fishing tip up as in claim 21, said stop accommodating uncoupling of said shaft and said collar when a fish pulls on the hook, resulting in the shaft, and thus the hook, being jerked upwardly by a biasing force of said spring, said spool being free to rotate without active restraint, and thus to pay out line, after said spring jerks said shaft upwardly.

27. An ice fishing tip up as in claim 25, said stop accommodating uncoupling of said shaft and said collar when a fish pulls on the hook, resulting in the shaft, and thus the hook, being jerked upwardly by the biasing force of said spring, said spool being free to rotate without active restraint, and thus to pay out line, after said spring jerks said shaft upwardly.

28. An ice fishing tip up as in claim 21 wherein said spool can rotate about the third axis a limited distance before said spring jerks said shaft upwardly, wherein said spool is generally restrained from rotation while said spring is jerking said shaft upwardly, and wherein said spool can freely rotate and pay out line, after said spring jerks said shaft upwardly.

29. An ice fishing tip up, comprising:
(a) support structure for supporting said tip up on a surface of ice through which a user wishes to fish;
(b) a collar mounted to said support structure, said collar being mounted for extension along a first axis transverse to said support structure and toward a hole in the ice;
(c) a shaft mounted in said tip up, along a second axis generally coinciding with the first axis, said shaft being mounted for rotation with respect to said collar and being movable generally along the second axis relative to the collar between a released position and one of a plurality of set positions;
(d) a restraining handle disposed upwardly on said shaft from a top edge of said collar;
(e) a stop extending outwardly from said shaft, said stop being adapted and configured for temporarily coupling said shaft to said collar when said shaft is moved to one of the set positions against biasing force of said spring;
(f) a spring generally encircling about said shaft between the top edge of said collar and said restraining handle, and biasing said shaft against movement of said shaft with respect to said collar toward a respective one of the set positions, the encircling of said spring about said shaft respectively enclosing said stop therein such that movement of said stop with respect to said spring comprises said stop moving generally inside said spring;
(g) a spool adapted to carry fishing line; and
(h) a signal device activated when a fish pulls on the hook, said spring and stop being cooperatively sized, adapted, and configured such that said shaft and said spring can readily move with respect to each other along a length of said spring in operation of said tip up without said stop and said spring so interfering with each other as to unacceptably interfere with routine function of said tip up.

30. An ice fishing tip up as in claim 29, said spool being mounted for free-spool rotation about the third axis concurrent with rotation of said shaft about the second axis.

31. An ice fishing tip up as in claim 29, said spool being free to rotate without active restraint, and thus to pay out fishing line, after said spring jerks said shaft upwardly.

32. An ice fishing tip up as in claim 29, a slot extending longitudinally of said collar, a plurality of notches extending transversely from the direction of extension of the slot, said stop comprising a stud which traverses along the slot when said shaft is moved to the set position against the biasing force of said spring, and with traverse into a selected one of the notches, whereby said spring biases said stud against said collar at an edge of the respective slot.

33. An ice fishing tip up as in claim 32, the slot extending downwardly from the top edge of said collar, said tip up being effectively set for hooking fish by turning said shaft, as necessary, about the second axis to bring said stud into alignment with the slot, pushing said shaft downwardly with respect to said collar and against biasing resistance force of said spring, whereby said stud progresses downwardly in the slot, turning said shaft with respect to the second axis and thereby engaging said stud in a said notch, and releasing downward force on said shaft whereby said stud engages said collar at an engagement edge of said collar at the respective notch.

34. An ice fishing tip up as in claim 29, said stop accommodating uncoupling of said shaft and said collar when a fish pulls on the hook, resulting in the shaft, and thus the hook, being jerked upwardly by a biasing force of said spring, said spool being free to rotate without active restraint, and thus to pay out line after said spring jerks said shaft upwardly.

35. An ice fishing tip up as in claim 33, said stop accommodating uncoupling of said shaft and said collar when a fish pulls on the hook, resulting in the shaft, and thus the hook, being jerked upwardly by the biasing force of said spring, said spool being free to rotate without active restraint, and thus to pay out line after said spring jerks said shaft upwardly.

36. An ice fishing tip up as in claim 35, release of said stud from engagement with said collar comprising frictional sliding of said stud against said collar at the respective engagement edge of the collar at the respective notch, whereby magnitude of the upward jerk and magnitude of the sliding force both strongly correlate with the relative position of the respective notch along the length of the slot.

37. An ice fishing tip up as in claim 35, release of said stud from engagement with said collar comprising rolling engagement of said stud against said collar at the respective engagement edge of the collar at the respective notch, whereby magnitude of force required to effect release of said stud from the respective notch is generally independent of the relative position of the notch along the length of the slot, while magnitude of the upward jerk strongly correlates to the relative position of the notch along the length of the slot.

38. An ice fishing tip up as in claim 34, said spool being restrained against rotating and thus paying out line concurrent with said spring jerking said shaft upwardly.

39. An ice fishing tip up as in claim 29 wherein said spool can rotate about the third axis a limited distance before said spring jerks said shaft upwardly, wherein said spool is generally restrained from rotation while said spring is jerking said shaft upwardly, and wherein said spool can freely rotate and pay out line, after said spring jerks said shaft upwardly.

40. An ice fishing tip up, comprising:
- (a) support structure for supporting said tip up on a surface of ice through which a user wishes to fish;
- (b) a collar mounted to said support structure, said collar being mounted for extension along a first axis transverse to said support structure and toward a hole in the ice;
- (c) a shaft mounted in said tip up, along a second axis generally coinciding with the first axis, said shaft being mounted for rotation with respect to said collar and being movable generally along the second axis relative to the collar between a released position and one of a plurality of set positions;
- (d) a spring biasing said shaft against movement of said shaft with respect to said collar toward a respective one of the set positions, thus to jerk said shaft upwardly relative to said collar;
- (e) a stop on one of said collar and said shaft mounted for temporarily coupling said shaft and said collar together when said shaft is moved to the set position against biasing force of said spring;
- (f) a spool adapted to carry fishing line and corresponding hook on the fishing line, said spool being mounted to said shaft for rotation about a third axis concurrent with all rotation of said shaft about the second axis thereby to initiate release of the stop from the coupling upon initiation of rotation of said spool; and
- (g) a signal device activated when a fish pulls on the hook.

* * * * *